(12) United States Patent
Kono et al.

(10) Patent No.: US 8,669,729 B2
(45) Date of Patent: Mar. 11, 2014

(54) POWER CONVERTING APPARATUS FOR ELECTRIC VEHICLE

(75) Inventors: Masaki Kono, Tokyo (JP); Kenichi Kusano, Tokyo (JP); Yoshinori Yamashita, Tokyo (JP); Hidetoshi Kitanaka, Tokyo (JP); Keita Hatanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 4 days.

(21) Appl. No.: 13/497,140

(22) PCT Filed: Oct. 22, 2009

(86) PCT No.: PCT/JP2009/068189
§ 371 (c)(1),
(2), (4) Date: Mar. 20, 2012

(87) PCT Pub. No.: WO2011/048683
PCT Pub. Date: Apr. 28, 2011

(65) Prior Publication Data
US 2012/0181961 A1 Jul. 19, 2012

(51) Int. Cl.
*H02P 6/14* (2006.01)
(52) U.S. Cl.
USPC .................. 318/400.26; 318/599; 361/23
(58) Field of Classification Search
USPC .............................. 318/400.26, 599
See application file for complete search history.

(56) References Cited

U.S. PATENT DOCUMENTS

| 8,045,345 B2 | 10/2011 | Kono |
| 2007/0093359 A1 | 4/2007 | Kobayashi et al. |
| 2009/0251831 A1 | 10/2009 | Shiba et al. |
| 2010/0118569 A1 | 5/2010 | Kono et al. |
| 2010/0253267 A1* | 10/2010 | Kitanaka .................. 318/400.26 |

FOREIGN PATENT DOCUMENTS

| JP | 3927584 | 6/2007 |
| JP | 2008 11683 | 1/2008 |
| WO | 2009 087775 | 7/2009 |

OTHER PUBLICATIONS

Office Action issued May 22, 2013 in Korean Patent Application No. 10-2012-7009740 with English language translation.
International Search Report issued on Jan. 12, 2010 in PCT/JP09/068189 filed on Oct. 22, 2009.

* cited by examiner

*Primary Examiner* — Eduardo Colon Santana
*Assistant Examiner* — Devon Joseph
(74) *Attorney, Agent, or Firm* — Oblon, Spivak, McClelland, Maier & Neustadt, L.L.P.

(57) ABSTRACT

A controller that controls ON/OFF of switching elements and opening/closing of an opening/closing unit based on currents detected by current detectors. The controller includes a fault detector that detects whether any of the switching elements has a short-circuit fault and outputs a signal indicating a detection result, an ON/OFF controller that sets one of the switching elements that constitutes a phase other than a first phase that involves the short-circuit fault to an ON operation state and outputs a signal for opening the opening/closing unit, and an opening/closing controller that opens an opening/closing unit connected to a third phase other than the first phase and the second phase in which one of the switching elements is set to the ON operation state by the ON/OFF controller.

3 Claims, 8 Drawing Sheets

(a)

(b)

POWER CONVERTING APPARATUS FOR ELECTRIC VEHICLE

FIELD

The present invention relates to a power converting apparatus for driving a synchronous machine used for electric vehicles including railway vehicles and electric cars, and more particularly to a power converting apparatus including an opening/closing unit between a synchronous machine and a power converter.

BACKGROUND

A synchronous machine requires no exciting current because a magnetic flux is established by a magnet incorporated in a rotor, as compared to an induction machine commonly widely used in various fields, and generates no secondary copper loss because no electric current flows to the rotor as in the induction machine. Therefore, application of the synchronous machine to electric vehicles has been examined to improve their efficiency.

An electric vehicle runs while connecting a plurality of cars each having a power converter and a synchronous machine incorporated therein to form a unit. Therefore, even if a short-circuit fault occurs in switching elements that constitute a power converting apparatus of a part of the cars while these cars are running, the electric vehicles can run continuously by other normal power converters and synchronous machines. Accordingly, a short-circuit current due to an induced voltage of the synchronous machine continuously flows to a fault location (a short-circuited portion) of a faulty power converter. Consequently, if this state is left unsolved, a large short-circuit current flows, and thus fault locations of the power converter may increase or the synchronous machine may generate heat or burn out because the short-circuit current also flows to the synchronous machine.

As a measure against such a fault, Patent Literature 1 mentioned below discloses a power converting apparatus including: a power converter that has a plurality of on/off-controlled switching elements and converts a DC voltage to an AC voltage of an arbitrary frequency to drive an AC motor; a current detector that detects an output current of an opening/closing unit for AC blocking, which is connected between the power converter and a synchronous machine, and an output current of the power converter; and a controller that performs on/off control of the switching elements in the power converter and opening/closing control of the opening/closing unit based on at least the current detected by the current detector, for example. The controller includes a fault determining unit that determines whether any of the switching elements has a short-circuit fault or remains in an ON operation state based on a current value detected by the current detector and outputs a signal indicating a determination result, and a gate signal generator that outputs a control signal to the power converter according to the signal from the fault determining unit. When the signal from the fault determining unit indicates that any of switching elements belonging to an upper arm connected to a positive terminal has a short-circuit fault or remains in an ON operation state and that any of switching elements belonging to a lower arm connected to a negative terminal has a short-circuit fault or remains in the ON operation state, the gate signal generator outputs an ON control signal for setting all the switching elements to the ON operation state to the power converter. Accordingly, a fault current flowing between the power converter and the motor can be blocked when the fault current includes a DC component in which continuous current zero does not appear, irrespective of a type of a fault occurring in the power converting apparatus, thereby enabling to prevent the increase of fault locations in the power converter.

Patent Literature 2 mentioned below describes a measure to return a DC component as an average value of currents of a synchronous machine to zero by setting, when a short-circuit fault occurs in a switching element, the switching element to an ON operation state so that a motor terminal of a high-potential P-side arm or a low-potential N-side arm is short-circuited to include a phase having a short-circuit fault, thereby obtaining a three-phase short-circuit state.

CITATION LIST

Patent Literatures

Patent Literature 1: Japanese Patent No. 4252109 (Claim 1)

Patent Literature 2: Japanese Patent No. 3927584 (Paragraph [0093])

SUMMARY

Technical Problem

However, in the conventional power converting apparatus described above, when a short-circuit fault occurs, a switching element having the short-circuit fault and two or more switching elements need to be set to an ON operation state. Therefore, setting normal switching elements to an ON operation state when a large short-circuit current is flowing causes excessive stress on the switching elements. There can be a case that the normal switching elements set to the ON operation state also fail, and the fault may expand.

Furthermore, a transitional voltage (generally referred to as "surge voltage") is generated at the time of opening the opening/closing unit, and the transitional voltage is likely to exceed the voltage level of a dielectric strength voltage of the power converter and the synchronous machine. Consequently, an order of phases in which the opening/closing unit is opened needs to be selected taking it into consideration to decrease the transitional voltage as much as possible. However, since this is not taken into consideration in the conventional technique, there is a problem in that the occurrence of the transitional voltage described above cannot be suppressed.

The present invention has been achieved to solve the above problems, and an object of the present invention is to provide a power converting apparatus for an electric vehicle that can suppress a transitional voltage generated at the time of opening an opening/closing unit and can reduce load on switching elements having no fault.

Solution to Problem

There is provided a power converting apparatus for an electric vehicle according to an aspect of the present invention, the power converting apparatus comprising: a power converter that has a plurality of ON/OFF-controlled switching elements and converts a DC voltage to an AC voltage of an arbitrary frequency to drive an AC rotating machine; opening/closing units for AC blocking, connected between the power converter and the AC rotating machine; a current detector that detects a current flowing between the power converter and the AC rotating machine; and a controller that controls ON/OFF of the switching elements and opening/closing of the opening/closing units based on at least the current detected by the current detector, wherein the controller includes: a fault detector that detects whether any of the switching elements has a short-circuit fault or remains in an ON operation state based on a current value detected by the current detector, and outputs a signal indicating a detection result; an ON/OFF controller that when a switching element of a first phase has a short-circuit fault or remains in an ON operation state, sets one of the switching elements that constitute a phase other than the first phase to an ON operation state based on the signal from the fault detector and the current value, and outputs a signal for opening the opening/closing units; and an opening/closing controller that opens an opening/closing unit connected to a third phase other than the first phase and the second phase in which one of the switching elements thereof is set to the ON operation state by the ON/OFF controller based on the signal from the ON/OFF controller.

Advantageous Effects of Invention

According to the present invention, one of the switching elements that constitute a phase other than the first phase in which a switching element has a short-circuit fault or remains in an ON operation state is set to an ON operation state, and the opening/closing unit connected to the third phase other than the first phase and the second phase in which one of the switching elements thereof becomes ON is opened. Consequently, a transitional voltage generated at the time of opening the opening/closing unit can be suppressed, and load on switching elements having no fault can be reduced.

DESCRIPTION OF EMBODIMENTS

Exemplary embodiments of a power converting apparatus for an electric vehicle according to the present invention will be explained below in detail with reference to the accompanying drawings. The present invention is not limited to the embodiments.

First Embodiment

Figure 1:
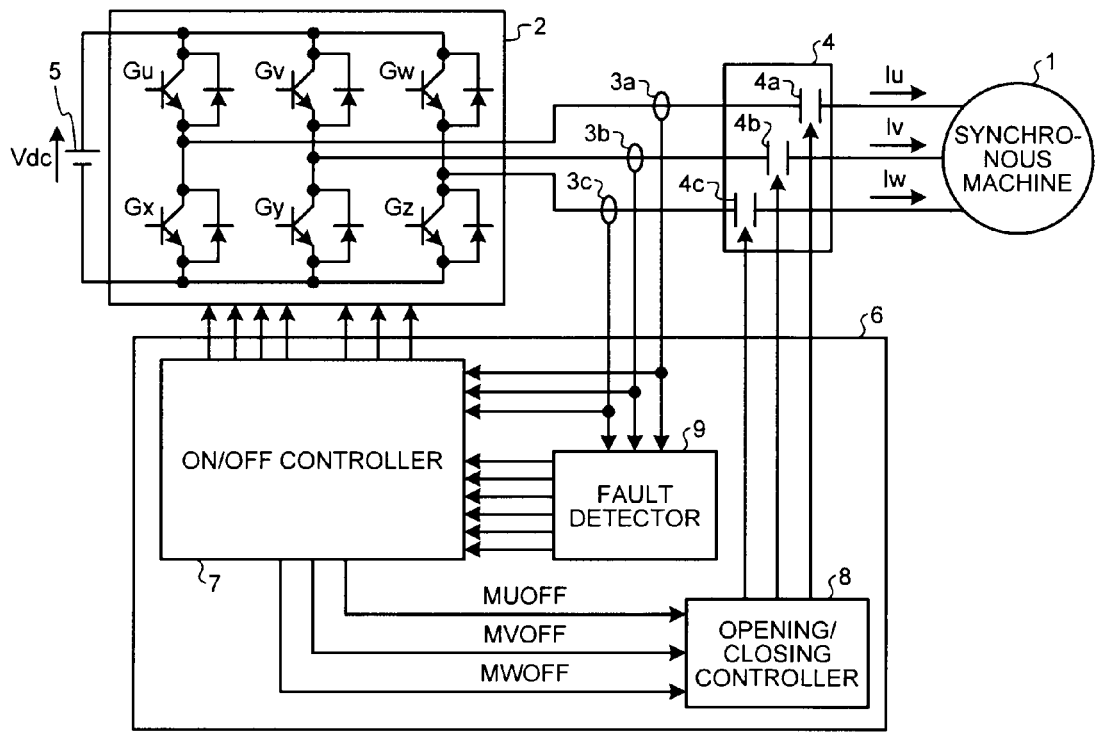
FIG. 1 is a configuration example of a power converting apparatus for an electric vehicle according to a first embodiment of the present invention.
Figure 2:
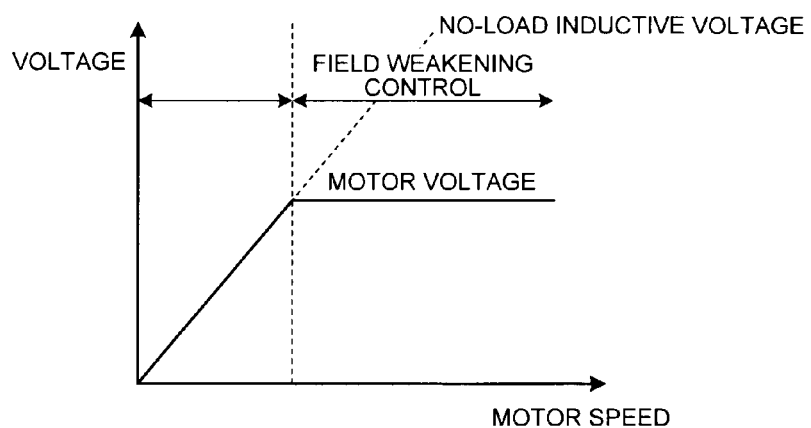
FIG. 2 depicts a relationship between a motor voltage of a synchronous machine and a no-load induced voltage.

FIG. 1 is a configuration example of a power converting apparatus for an electric vehicle according to a first embodiment of the present invention, and FIG. 2 depicts a relationship between a motor voltage of a synchronous machine 1 and a no-load induced voltage. The power converting apparatus for the electric vehicle shown in FIG. 1 includes a power converter 2 connected to a DC power supply 5 to drive the synchronous machine 1, an opening/closing unit 4 for AC blocking connected between the power converter 2 and the AC rotating machine 1, and a controller 6 that performs operational control of the power converter 2 and opening control of the opening/closing unit 4.

The power converter 2 includes a bridge circuit between three switching (hereinafter, simply "SW") elements on a positive-side arm (a U-phase upper-arm element Gu, a V-phase upper-arm element Gv, and a W-phase upper-arm element Gw) and three SW elements on a negative-side arm (a U-phase lower-arm element Gx, a V-phase lower-arm element Gy, and a W-phase lower-arm element Gz). An anti-parallel diode is connected to each of the SW elements. Connection points between the upper-arm elements and the lower-arm elements in the respective phases constitute three-phase output terminals, and U-phase connection, V-phase connection, and W-phase connection are connected to the output terminals, respectively. The U-phase connection, V-phase connection, and W-phase connection are connected to the synchronous machine 1 via the opening/closing unit 4. According to this configuration, in the power converter 2, each of the SW elements is on/off operated according to a gate signal from the controller 6 to convert an input DC voltage to a three-phase AC voltage of an arbitrary frequency, thereby driving the synchronous machine 1.

The controller 6 includes, as main components, an ON/OFF controller 7, an opening/closing controller 8 that controls the opening/closing unit 4, and a fault detector 9 that detects a short-circuit fault in the SW elements Gu, Gv, Gw, Gx, Gy, and Gz included in the power converter 2.

In the present embodiment, the synchronous machine 1 shown in FIG. 1 is a permanent-magnet synchronous machine that forms a magnetic field by a permanent magnet fitted to a rotor. In the case of the permanent-magnet synchronous machine, because a magnetic flux formed by the permanent magnet is constant, the synchronous machine generates an induced voltage proportional to a product of magnetic flux density and a rotation speed of the synchronous machine, as a characteristic of the synchronous machine single body. This voltage is referred to as "no-load induced voltage", which has a characteristic shown by a dotted line in FIG. 2. On the other hand, the power converter 2 cannot generate a voltage higher than the DC voltage input from the DC power supply 5. Accordingly, in a region where the no-load induced voltage exceeds a maximum output voltage of the power converter 2, so-called field-weakening control is performed by the power converter 2 to generate a magnetic flux canceling the magnetic flux formed by the permanent magnet using an armature winding, thereby achieving a high-speed operation.

Electric vehicles such as an automobile and a train have an operation mode referred to as "coasting", in which while the power converter 2 is stopped, the electric vehicle runs by inertia, not by power running or regeneration. When the permanent-magnet synchronous machine is to be used at the time of coasting, the no-load induced voltage described above is generated in the power converter 2. In the region where the no-load induced voltage is larger than the DC voltage of the power converter 2 (corresponding to a voltage between both ends of the DC power supply 5), the no-load induced voltage is full-wave rectified via diodes of the SW elements Gu to Gz included in the power converter 2. The full-wave rectified power is regenerated on the DC power supply 5 side, and as a result, a brake force is generated in the entire system, thereby performing a braking operation.

As is generally known, current zero appears in a sinusoidal AC current per half cycle of a current waveform, and thus the current can be blocked by using the current zero. The opening/closing unit 4 shown in FIG. 1 is a contactor for AC blocking that blocks a current by using the current zero. Generally, as a contactor for AC blocking, a vacuum contactor or the like that applies a mechanism for blocking a current at the current zero can be mentioned. However, as explained in the background art, the fault current may include a DC component in which a continuous current zero does not appear depending on the types of faults occurring in the power converter 2. In this case, in the vacuum contactor or the like for AC blocking that uses the mechanism for blocking a current at the current zero, blocking of the fault current cannot be performed. Consequently, the fault current cannot be blocked, and the fault current may flow continuously, which may increase fault locations in the power converter 2 due to heat generation or the like. The power converting apparatus according to the present embodiment is for solving such a problem. A specific mode thereof is explained below.

Current detectors 3a, 3b, and 3c of the phases shown in FIG. 1 are respectively installed in the U-phase connection, V-phase connection, and W-phase connection between the three-phase output terminals of the power converter 2 and the opening/closing unit 4 to detect respective phase currents (these currents can be referred to also as "motor currents") Iu, Iv, and Iw generated in the synchronous machine 1. The phase currents Iu, Iv, and Iw detected by the current detectors 3a, 3b, and 3c are respectively input to the fault detector 9 and the ON/OFF controller 7.

The power converting apparatus shown in FIG. 1 uses a CT or the like as means for detecting the currents in the U-phase to W-phase connections between the three-phase output terminals of the power converter 2 and the opening/closing unit 4. However, the present invention is not limited thereto, and the invention can also use a mode in which the phase currents Iu, Iv, and Iw are detected by using another known method, for example, by using a bus current flowing into the power converter 2. Furthermore, the power converting apparatus shown in FIG. 1 uses a mode of detecting the three-phase output currents of the power converter 2, respectively; however, the mode can be such that arbitrary two phase currents are detected. That is, because a relationship of Iu+Iv+Iw=0 is established, a W-phase current can be obtained from detected U-phase and V-phase currents, for example. Therefore, the current detector 3c for the W phase can be omitted, for example. Of course, the V-phase current can be obtained from the detected U-phase and W-phase currents.

Figure 3:
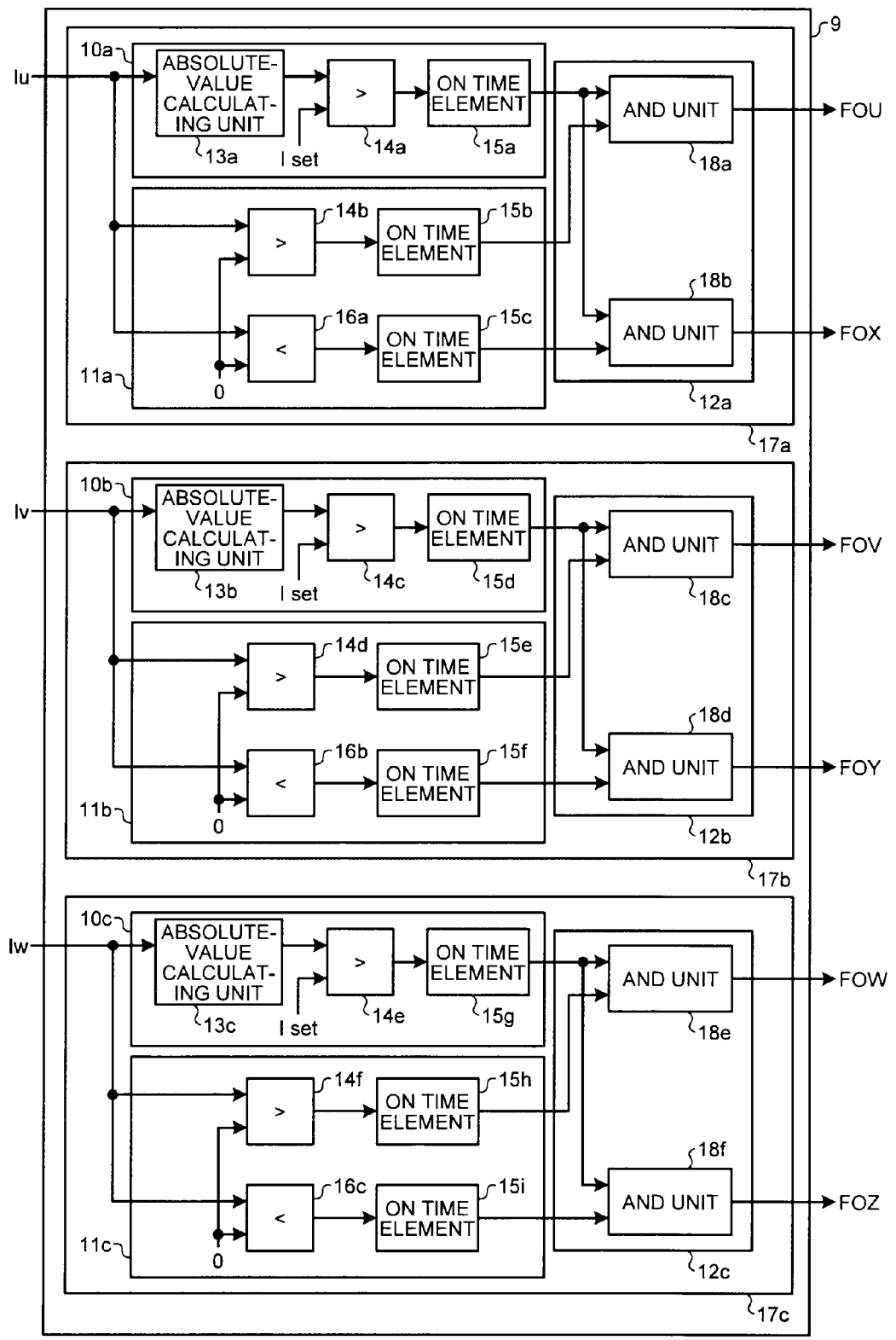
FIG. 3 is a configuration example of a fault detector shown in FIG. 1.
Figure 4:
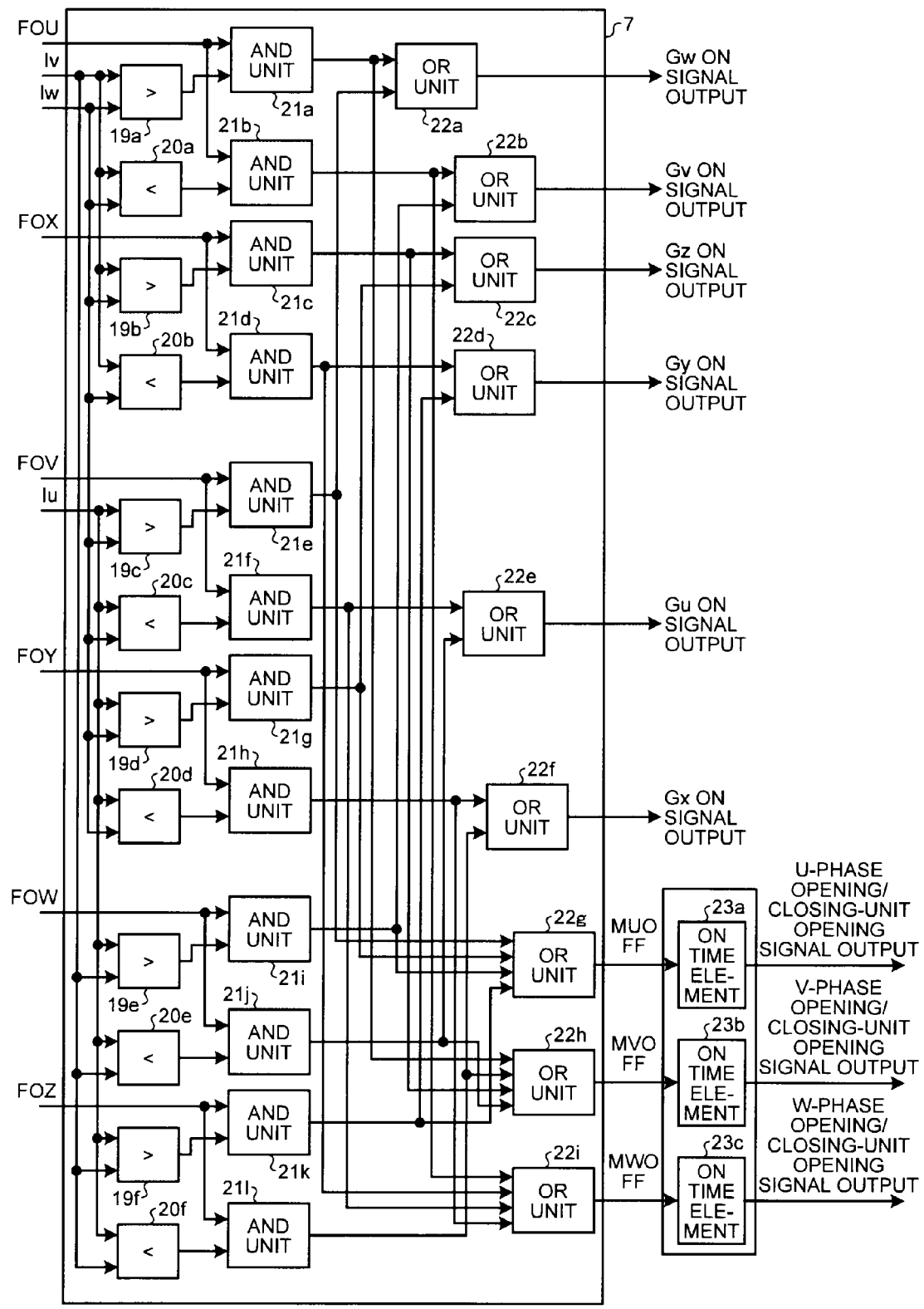
FIG. 4 is a configuration example of an ON/OFF controller shown in FIG. 1.
Figure 5:
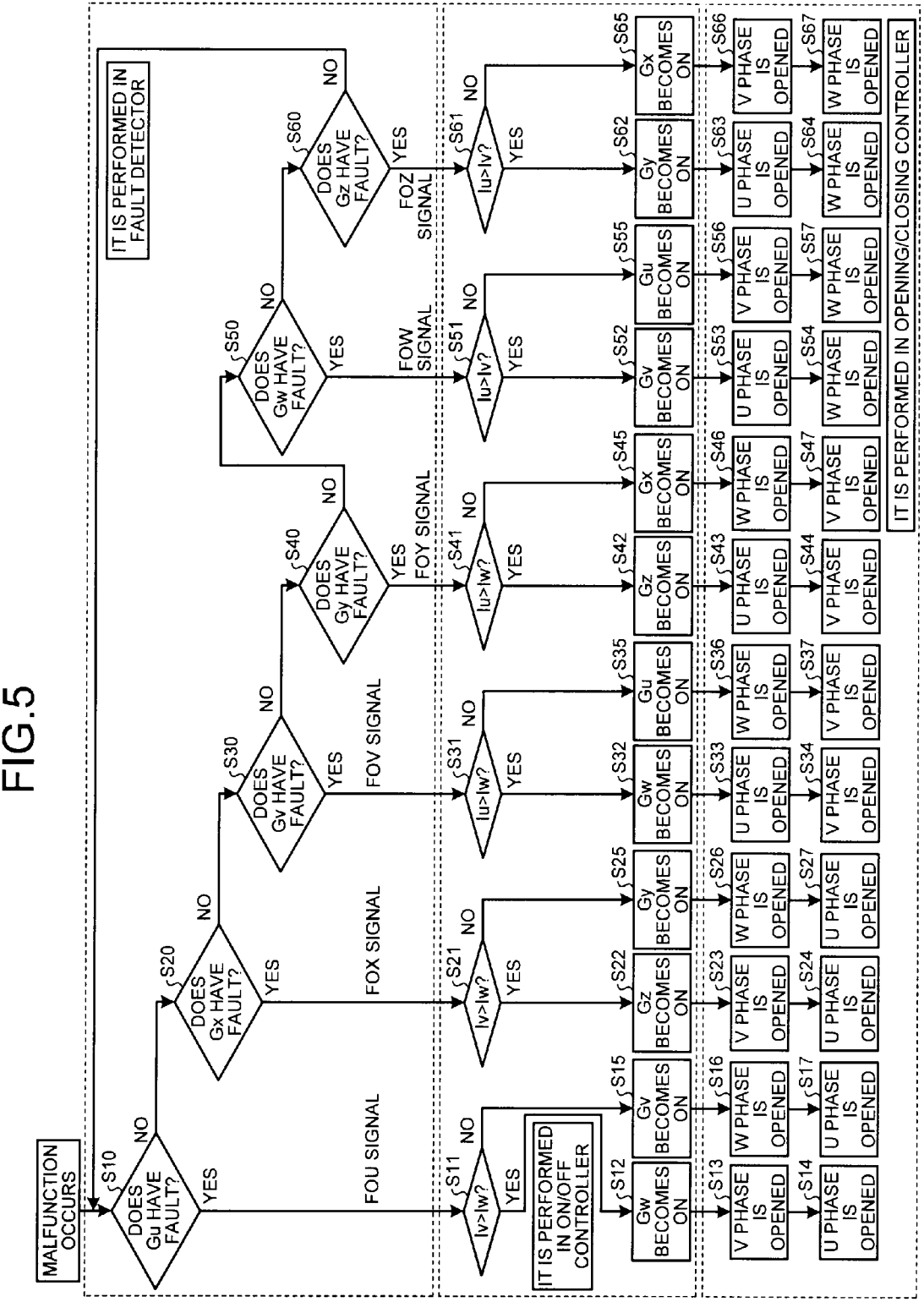
FIG. 5 is a flowchart explaining a series of operations performed since an abnormality occurs in a power converter shown in FIG. 1 until an opening/closing unit is opened.
Figure 6:
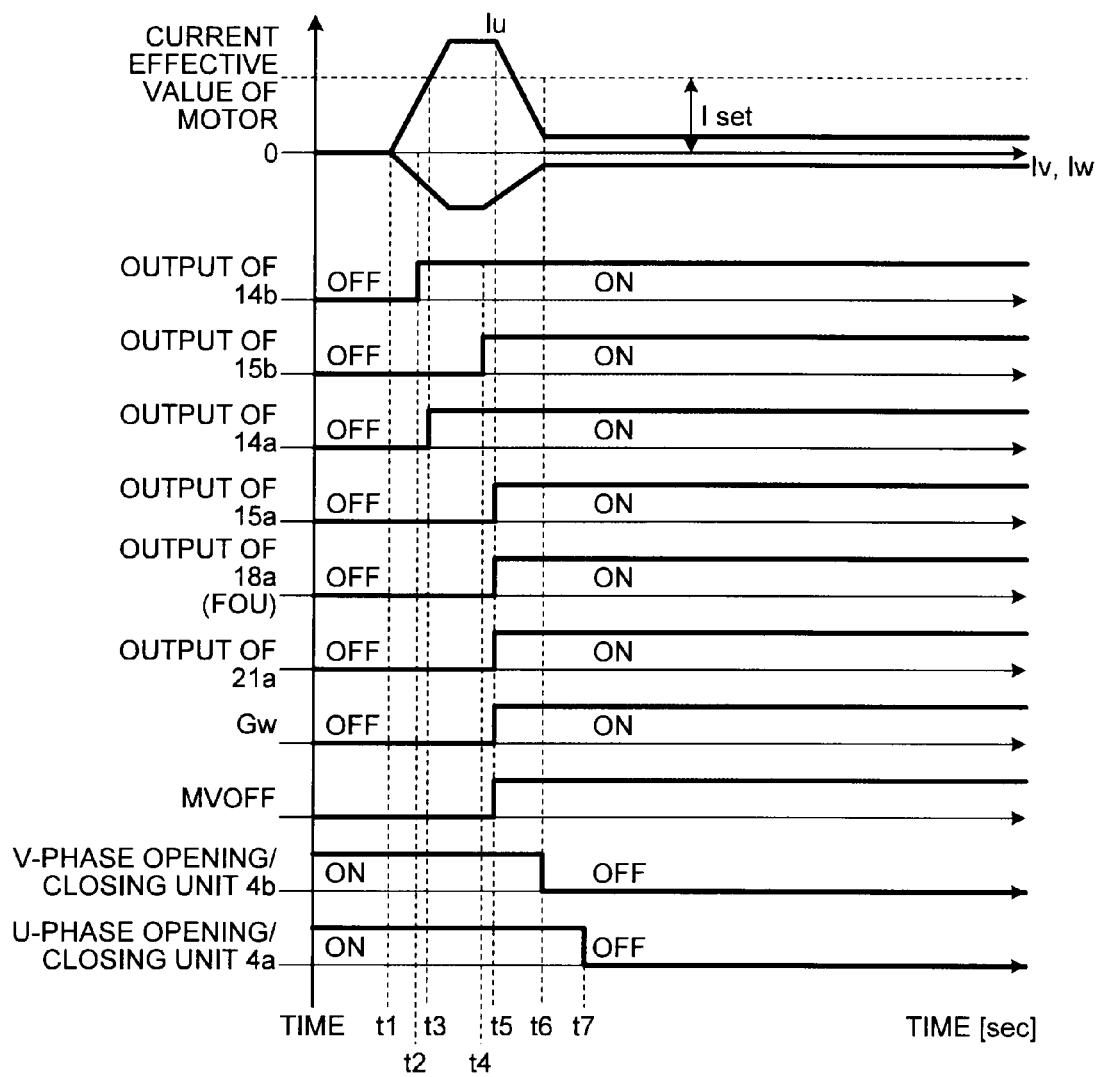
FIG. 6 is an explanatory diagram of an operation when a switching element belonging to a U-phase upper arm has a short-circuit fault.

FIG. 3 is a configuration example of the fault detector 9 shown in FIG. 1, FIG. 4 is a configuration example of the ON/OFF controller 7 shown in FIG. 1, FIG. 5 is a flowchart explaining a series of operations performed since an abnormality occurs in the power converter 2 shown in FIG. 1 until the opening/closing unit 4 is opened, and FIG. 6 is an explanatory diagram of an operation when the SW element Gu belonging to the U-phase upper arm has a short-circuit fault.

(Fault Detector)

In FIG. 3, the phase currents Iu, Iv, and Iw detected by the current detectors 3a, 3b, and 3c, respectively, are input to the fault detector 9 in the controller 6. The fault detector 9 shown in FIG. 3 includes, as main components, a U-phase fault detector 17a to which the U-phase current Iu is input, a V-phase fault detector 17b to which the V-phase current Iv is input, and a W-phase fault detector 17c to which the W-phase current Iw is input.

The fault detectors 17a, 17b, and 17c detect which of the upper arm and the lower arm in each phase has a fault based on the motor current of each phase (each phase current), and output an error signal indicating a fault location. The error signal is, for example, a U-phase upper-arm fault detection signal FOU shown in FIG. 3. Thus, the fault detectors 17a, 17b, and 17c are for detecting which of the upper arm and the lower arm in each phase has a fault. Although input signals and output signals thereof are different, functions thereof are the same. Therefore, in the following explanations, only the U-phase fault detector 17a is explained, and explanations of the V-phase fault detector 17b and the W-phase fault detector 17c are omitted.

The U-phase fault detector 17a shown in FIG. 3 includes, as main components, a U-phase short-circuit-fault detector 10a that detects whether the U phase has a fault (particularly, a short-circuit fault) based on the magnitude of the U-phase current Iu, a U-phase current-code determining unit 11a that determines a flowing direction of the U-phase current Iu, and a U-phase fault-location detector 12a that detects and specifies a fault location in the U phase based on outputs from the U-phase short-circuit-fault detector 10a and the U-phase current-code determining unit 11a.

The U-phase short-circuit-fault detector 10a includes, as main components, an absolute-value calculating unit 13a that calculates an absolute value of the input U-phase current Iu, a greater-than comparator 14a, and an ON time element 15a.

The greater-than comparator 14a compares the absolute value from the absolute-value calculating unit 13a with a predetermined set value Iset. This is based on the knowledge that a current flowing in a phase in which a SW element is short-circuited is not zero but has a value acquired by adding an offset to an AC component. This is specifically explained below. FIG. 6 depicts current waveforms when the SW element Gu belonging to the U-phase upper arm has a short-circuit fault. It can be confirmed that phase currents other than the U-phase current cross zero; however, the U-phase current does not cross zero and has a waveform added with an offset. The U-phase short-circuit-fault detector 10a detects a short-circuit fault based on this fact. That is, when there is an offset larger than the predetermined set value Iset in the waveform of the U-phase current, the greater-than comparator 14a outputs "1" indicating that a short-circuit fault occurs in the U phase. While the predetermined set value Iset is defined according to the characteristics of the synchronous machine 1, it is appropriate to set the predetermined set value Iset to a value of 1.5 to 2 times the rated current value. That is, when it is assumed that an effective value of the rated current is 200 amperes, it is desired that the predetermined set value Iset is set to about 300 to 400 amperes.

The ON time element 15a has a function for preventing erroneous detection, and for example, when the greater-than comparator 14a outputs 1 continuously for a time period set in the ON time element 15a or longer, the ON time element 15a outputs 1. The time period set in the ON time element 15a is, for example, 5 milliseconds. In this example, the time periods set in ON time elements 15b, 15c, 15d, 15e, and 15f are 5 milliseconds. The output of the ON time element 15a is input to AND units 18a and 18b.

The configuration of the U-phase current-code determining unit 11a is explained next. The U-phase current Iu is input to the U-phase current-code determining unit 11a, and the U-phase current-code determining unit 11a determines the flowing direction of the U-phase current Iu. The U-phase current-code determining unit 11a includes, as main components, a greater-than comparator 14b, a less-than comparator 16a, the ON time element 15b, and the ON time element 15c.

The greater-than comparator 14b and the less-than comparator 16a compare the value of the U-phase current Iu with zero to determine whether the U-phase current Iu is flowing to a positive side or a negative side. The ON time element 15b and the ON time element 15c have a function for preventing erroneous detection as the ON time element 15a. An output of the ON time element 15b is input to the AND unit 18a, and the output of the ON time element 15c is input to the AND unit 18b.

The U-phase fault-location detector 12a includes, as main components, the AND unit 18a and the AND unit 18b. The AND unit 18a outputs the U-phase upper-arm fault detection signal FOU when the output of the U-phase short-circuit-fault detector 10a and the output of the ON time element 15b are both 1. That is, when the U-phase short-circuit-fault detector 10a detects a short-circuit fault and the U-phase current Iu is flowing in a positive direction, the U-phase fault-location detector 12a detects that the SW element Gu as the U-phase upper arm has a short-circuit fault.

Furthermore, the AND unit 18b outputs a U-phase lower-arm fault detection signal FOX when the output of the U-phase short-circuit-fault detector 10a and the output of the ON time element 15c are both 1. That is, when the U-phase short-circuit-fault detector 10a detects a short-circuit fault and the U-phase current Iu is flowing in a negative direction, the U-phase fault-location detector 12a detects that the SW element Gx as the U-phase lower arm has a short-circuit fault.

In this manner, the fault detector 9 shown in FIG. 1 specifies and detects a short-circuit fault location based on the phase currents Iu, Iv, and Iw, and outputs the U-phase upper-arm fault detection signal FOU or the U-phase lower-arm fault detection signal FOX indicating a detection result of the short-circuit fault location to the ON/OFF controller 7.

(On/Off Controller)

The ON/OFF controller 7 selects an SW element having no fault based on the fault detection signal from the fault detector 9 and the phase currents Iu, Iv, and Iw detected by the current detectors 3a, 3b, and 3c, respectively, to prevent an expansion of a fault and sets the selected SW element to an ON operation state. Furthermore, the ON/OFF controller 7 generates opening commands MUOFF, MVOFF, and MWOFF for controlling an order in which the U-phase opening/closing unit 4a, the V-phase opening/closing unit 4b, and the W-phase opening/closing unit 4c are opened, and outputs these commands to the opening/closing controller 8. Accordingly, it can be suppressed that a transitional voltage generated at the time of opening the opening/closing unit 4 exceeds the voltage level of a dielectric strength voltage of the power converter 2 and the synchronous machine 1.

FIG. 5 depicts operations of respective elements included in the controller 6. For example, when an abnormality occurs in the power converter 2, the fault detector 9 shown in the upper part of FIG. 5 specifies and detects a short-circuit fault location. The ON/OFF controller 7 shown in the middle part of FIG. 5 selects an SW element to be set to an ON operation state based on the fault detection signal from the fault detector 9, and sets the selected SW element to the ON operation state. The opening/closing controller 8 shown in the lower part of FIG. 5 opens the opening/closing units 4a, 4b, and 4c based on the opening commands MUOFF, MVOFF, and MWOFF output from the ON/OFF controller 7.

With reference to FIGS. 5 and 6, the operation of the controller 6 is explained below in association with the flowchart of FIG. 5. In the following explanations, the U phase are sometimes referred to as "first phase", a V phase as "third phase", and the W phase as "second phase".

As shown in FIG. 6, when the SW element Gu belonging to the U-phase upper arm has a fault at a time t1 (YES at Step S10), the U-phase current Iu flows in the positive direction. Accordingly, an output of the greater-than comparator 14b shown in FIG. 3 becomes ON (or 1) at a time t2, and an output of the ON time element 15b becomes ON at a time t4 delayed by the time period set in the ON time element 15b.

Furthermore, an output of the greater-than comparator 14a becomes ON at a time point when the U-phase current Iu exceeds the predetermined set value Iset, that is, at a time t3. The output from the comparator 14a is input to the ON time element 15a, and an output of the ON time element 15a becomes ON at a time t5 delayed by the time period set in the ON time element 15a.

The output from the ON time element 15a and the output from the ON time element 15b are input to the AND unit 18a. When both of the outputs are ON, an output of the AND unit 18a becomes ON. That is, the AND unit 18a sends the U-phase upper-arm fault detection signal FOU to the ON/OFF controller 7.

Next, in the ON/OFF controller 7 shown in FIG. 4, a greater-than comparator 19a and a less-than comparator 20a compare the motor current Iv with the motor current Iw (Step S11). When the motor current Iv is larger than the motor current Iw (YES at Step S11), an output of the greater-than comparator 19a becomes ON.

A signal input to an AND unit 21a, that is, an output from the greater-than comparator 19a and the U-phase upper-arm fault detection signal FOU are both ON. Therefore, an output of the AND unit 21a becomes ON to set the SW element Gw on the W-phase upper arm to an ON operation state. The output of the AND unit 21a is sent to an OR unit 22a.

The OR unit 22a generates a Gw ON signal based on the output from the AND unit 21a, and outputs the Gw ON signal to the power converter 2. The SW element Gw becomes ON according to the Gw ON signal (Step S12).

The output of the AND unit 21a is also sent to an OR unit 22h, and the OR unit 22h generates the V-phase opening/closing-unit opening command MVOFF based on the output from the AND unit 21a and outputs the V-phase opening/closing-unit opening command MVOFF to an ON time element 23b.

In practice, there is a slight time delay until the SW element Gw becomes the ON operation state. Therefore, an output of the ON time element 23b (V-phase opening/closing-unit opening signal output) becomes OFF at a time t6 delayed by the time period set in the ON time element 23b. As a result, the V-phase opening/closing unit 4b is opened at the time t6 (Step S13).

The U-phase opening/closing unit 4a is opened at a time t7, waiting for a predetermined time after the V-phase opening/closing unit 4b is opened (Step S14). It is found from a simulation result and the like that the predetermined time to be waited after the V-phase opening/closing unit 4b is opened can be considerably reduced by turning on a certain SW element (referred to as Gw in the above explanations) as compared to conventional methods.

At Step S11, when the motor current Iv is smaller than the motor current Iw (NO at Step S11), an output of the less-than comparator 20a shown in FIG. 4 becomes ON. The output from the less-than comparator 20a input to an AND unit 21b and the U-phase upper-arm fault detection signal FOU are both ON. Therefore, an output from the AND unit 21b becomes ON to set the SW element Gv to an ON operation state. An OR unit 22b generates a Gv ON signal based on the output from the AND unit 21b. The SW element Gv becomes ON according to this Gv ON signal (Step S15).

The output from the AND unit 21b is also sent to an OR unit 22i, and the OR unit 22i generates a W-phase opening/closing-unit opening command MWOFF based on the output from the AND unit 21b and outputs the W-phase opening/closing-unit opening command MWOFF to an ON time element 23c.

An output from the ON time element 23c becomes OFF at the time t6 delayed by the time period set in the ON time element 23c. As a result, the W-phase opening/closing unit 4c is opened at the time t6 (Step S16). Furthermore, the U-phase opening/closing unit 4a is opened at the time t7, waiting for a predetermined time after the W-phase opening/closing unit 4c is opened (Step S17).

At Step S10, when the SW element Gu belonging to the U-phase upper arm has no fault (NO at Step S10), the fault detector 9 determines whether the SW element Gx belonging to the U-phase lower arm has a fault (Step S20).

In this manner, the fault detector 9 sequentially determines whether each of the SW elements has a fault, and when the SW element Gz belonging to the W-phase upper arm has no fault (NO at Step S60), the fault detector 9 repeats determination at Step S10 and subsequent steps. The ON/OFF controller 7 performs ON control of each of the SW elements and generates opening/closing-unit opening commands for the opening/closing controller 8 based on the fault detection signals FOX to FOZ and the phase currents Iu, Iv, and Iw. The opening/closing controller 8 performs an opening operation of the opening/closing units 4a, 4b, and 4c based on the opening/closing-unit opening commands. Steps S20 to S67 are same as those described above, and thus explanations thereof will be omitted.

Figure 7:
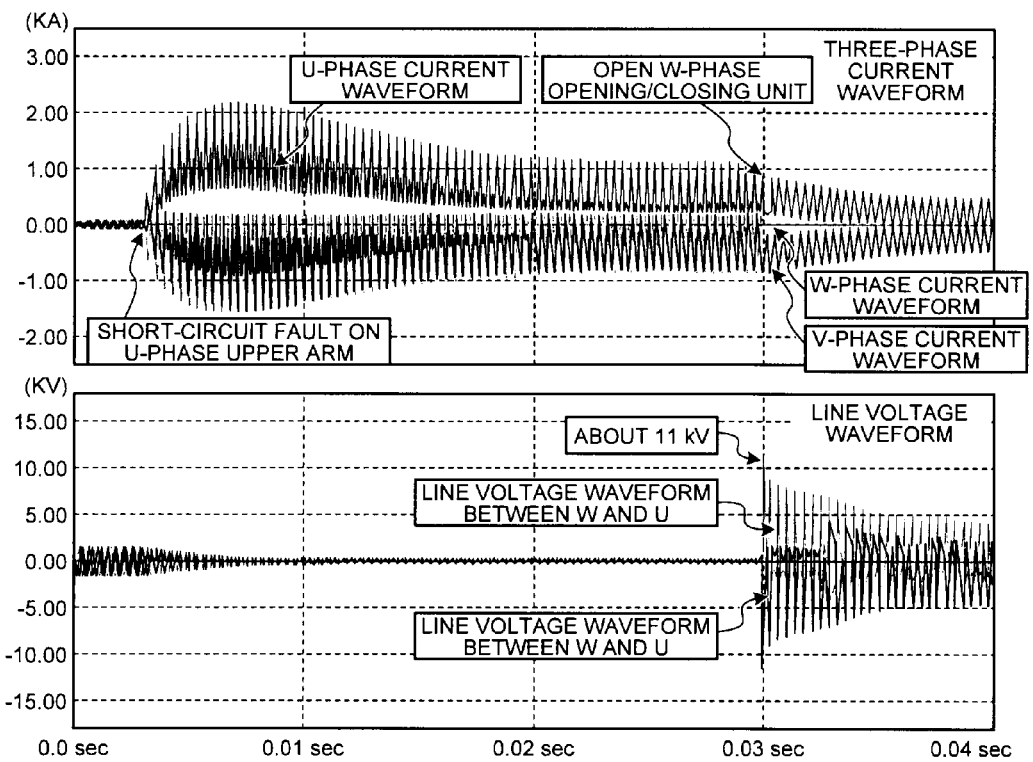
FIG. 7 is an explanatory diagram of an effect acquired by the power converting apparatus of an electric vehicle according to the first embodiment of the present invention.
Figure 7:
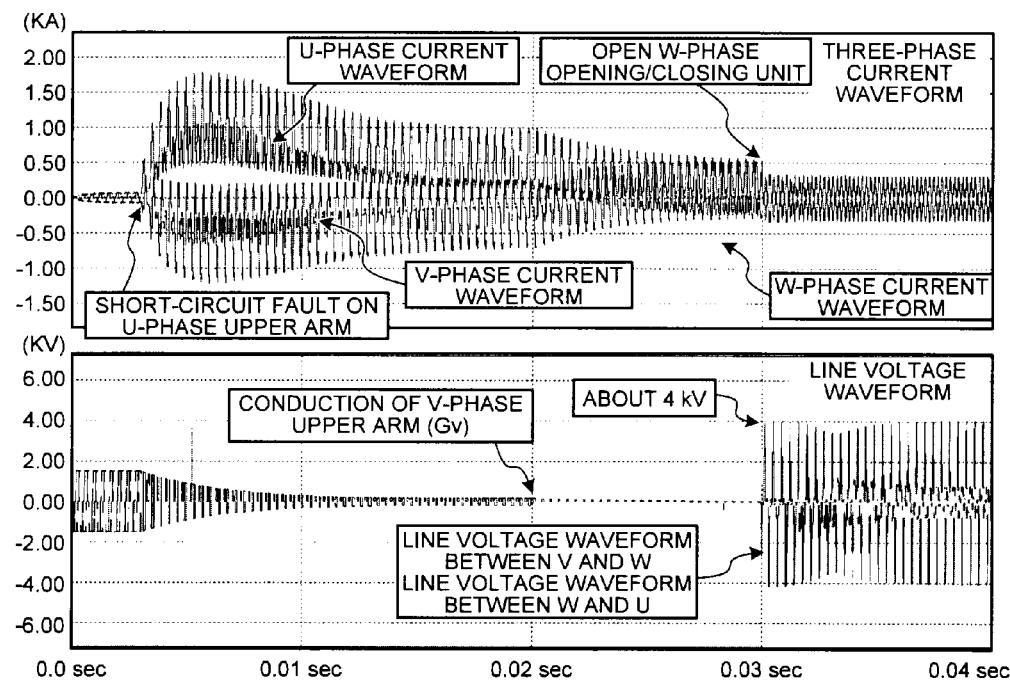

FIG. 7 is an explanatory diagram of an effect acquired by the power converting apparatus of an electric vehicle according to the first embodiment of the present invention. A simulation result acquired by a conventional method is shown in FIG. 7(a) and a simulation result acquired by the present embodiment is shown in FIG. 7(b). Each waveform shown in FIG. 7(a) and FIG. 7(b) is acquired when the SW element Gu belonging to the U-phase upper arm has a short-circuit fault by using a 300-kW motor for electric railways with a rated voltage of 3 kilovolts.

To facilitate understanding of the waveforms shown in FIG. 7, a generation state of a fault current in which continuous current zero does not appear is explained, and thereafter operations of the controller 6 according to the present embodiment are explained. As the generation state of a fault current in which continuous current zero does not appear, there can be mentioned a case in which an arbitrary one of the six SW elements Gu to Gz shown in FIG. 1 has a short-circuit fault, or a case in which a SW element remains in an ON operation state due to a fault in the SW element or a drive circuit thereof (not shown). For example, in a state where the power converting apparatus is in operation and the synchronous machine 1 is rotating, when the SW element Gu has a short-circuit fault and the remaining SW elements Gv to Gz are all in an OFF state due to a fault detection function (not shown), a fault current flows between the synchronous machine 1 and the power converter 2 through the SW element Gu and the anti-parallel diodes connected to the SW elements Gv to Gz. Three-phase current waveforms shown in the upper parts of FIG. 7(a) and FIG. 7(b) represent waveforms of the fault current in the respective phases at this time.

The waveform shown in the upper part of FIG. 7(a) is the three-phase current waveform at the time of opening the opening/closing unit 4 without setting the SW elements other than the SW element Gu to an ON operation state when the SW element Gu has a short-circuit fault. The waveform shown in the lower part of FIG. 7(a) represents a line voltage waveform at this time.

The waveform shown in the upper part of FIG. 7(b) is the three-phase current waveform at the time of setting the SW element Gv, for example, to an ON operation state and opening the W-phase opening/closing unit 4c when the SW element Gu has a short-circuit fault. The waveform shown in the lower part of FIG. 7(b) represents a line voltage waveform at this time.

In the simulation result shown in FIG. 7(a), when the SW element Gu has a short-circuit fault, for example, the U-phase current Iu is offset to a positive side, and accordingly there is no current zero. It can be confirmed that when the W-phase opening/closing unit 4c is opened after about 0.03 second since the occurrence of a short-circuit fault, a maximum value of the line voltage waveform between the W phase and the U phase becomes about 11 kilovolts. The dielectric strength voltage of this motor is about 6000 volts because the rated voltage is 3000 volts, and this implies that a voltage about two times the dielectric strength voltage is applied.

In comparison thereto, the ON/OFF controller 7 according to the present embodiment sets the SW element Gv of the V-phase upper arm to an ON operation state based on a control algorithm shown in FIG. 5 after about 0.02 second since the occurrence of a short-circuit fault in the SW element Gu, for example, as shown in FIG. 7(b). Furthermore, the opening/closing controller 8 opens the W-phase opening/closing unit 4c after about 0.03 second since the occurrence of the short-circuit fault.

At this time, the maximum value of each line voltage waveform between the V phase and the W phase and between the W phase and the U phase becomes about 4 kilovolts as shown in the lower part of FIG. 7(b). That is, it can be confirmed that the transitional voltage is suppressed to a value lower than the dielectric strength voltage of the motor. Furthermore, as shown in the upper part of FIG. 7(b), it can be confirmed that because the current is stabilized and is close to zero even after the W-phase opening/closing unit 4c is opened, other phases can be also opened immediately.

FIG. 7 depict waveforms in which, when the SW element Gu has a short-circuit fault and the other SW elements Gv to Gz having no short-circuit fault are all in an OFF state, the U-phase current Iu is offset to the positive side and accordingly there is no current zero. However, when the SW element Gx on the U-phase lower arm on an opposite side has a short-circuit fault, and the other elements having no short-circuit fault are all in an OFF state, such a waveform that the U-phase current Iu is offset to a negative side and accordingly there is no current zero is acquired. This situation can occur similarly when another SW element has a short-circuit fault.

As explained above, when any of the switching elements included in the power converter 2 has a short-circuit fault or is in an ON operation state, the power converting apparatus according to the present embodiment sets one of the SW elements that constitute a phase other than the first phase (for example, the U phase) in which the SW element has a short-circuit fault or remains in the ON operation state to an ON operation state. Consequently, the opening/closing unit can be opened by using the current zero, thereby enabling to block the fault current reliably. Furthermore, the opening/closing unit connected to the third phase (for example, the V phase) other than the first phase (for example, the U phase) and the second phase in which one of the SW elements becomes an ON operation state (for example, the W phase) is opened in the first opening operation, and thus generation of a transitional voltage at the time of opening (blocking) the opening/closing unit can be suppressed. Furthermore, when the SW element Gu has a short-circuit fault, for example, because an operation of the SW element having no fault is limited only to one phase (for example, the W phase), stress and load on other SW elements having no fault (for example, Gv and Gy in the V phase) can be reduced, thereby enabling to prevent an expansion of a fault. As a result, because frequency of faults can be considerably reduced as compared to the conventional techniques, the reliability of the power converting apparatus is improved and the power converting apparatus can be used for a long time. Furthermore, the maintenance cost can be reduced.

In the above explanations, the opening/closing controller 8 controls operations of the three opening/closing units 4a, 4b, and 4c. However, the present invention is not limited thereto, and for example, control targets can be limited to two opening/closing units and only operations of the two opening/closing units can be controlled. For example, by limiting the opening operation to the W-phase opening/closing unit 4c and the U-phase opening/closing unit 4a, the number of operations of the opening/closing unit 4 can be reduced. Accordingly, deterioration of the opening/closing unit 4 can be suppressed, thereby enabling to extend the service life thereof.

Second Embodiment

Figure 8:
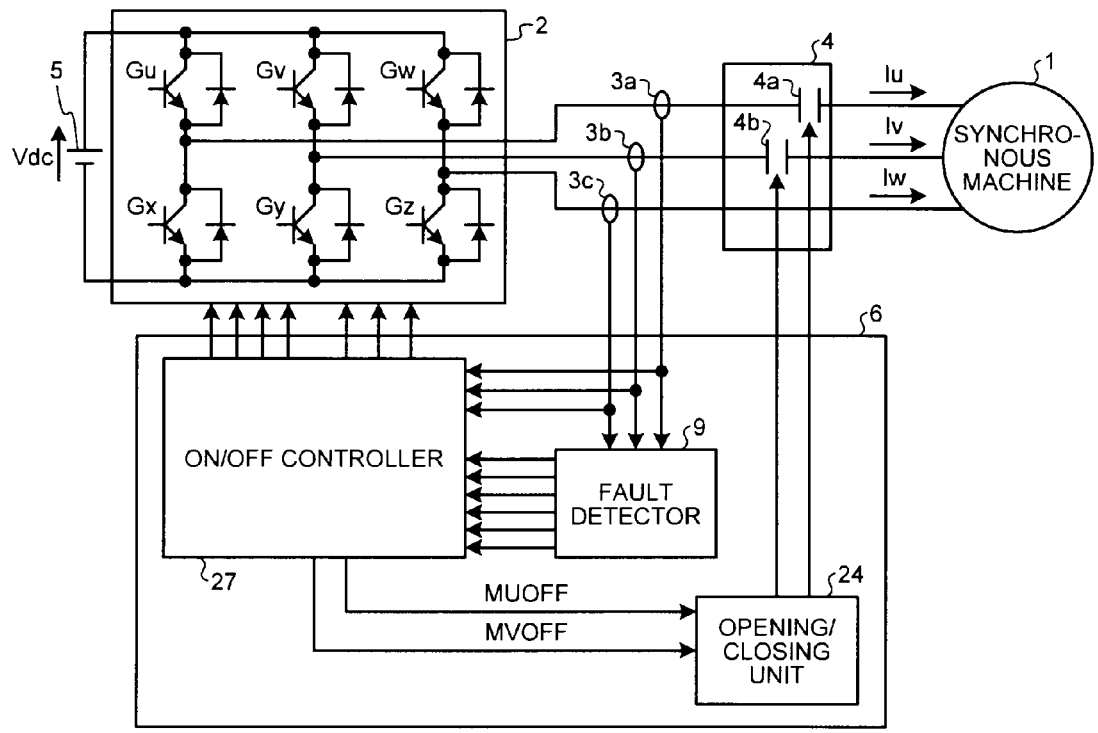
FIG. 8 depicts a configuration of a power converting apparatus for an electric vehicle according to a second embodiment of the present invention.
Figure 9:
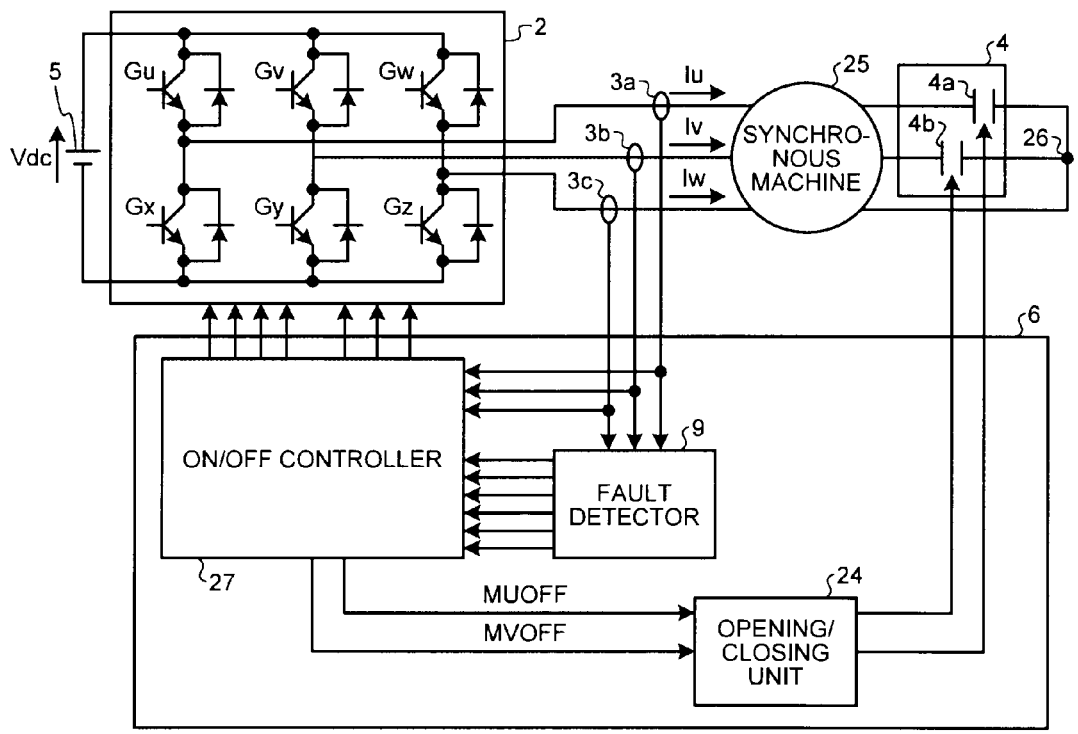
FIG. 9 depicts another configuration of the power converting apparatus for an electric vehicle according to the second embodiment.
Figure 10:
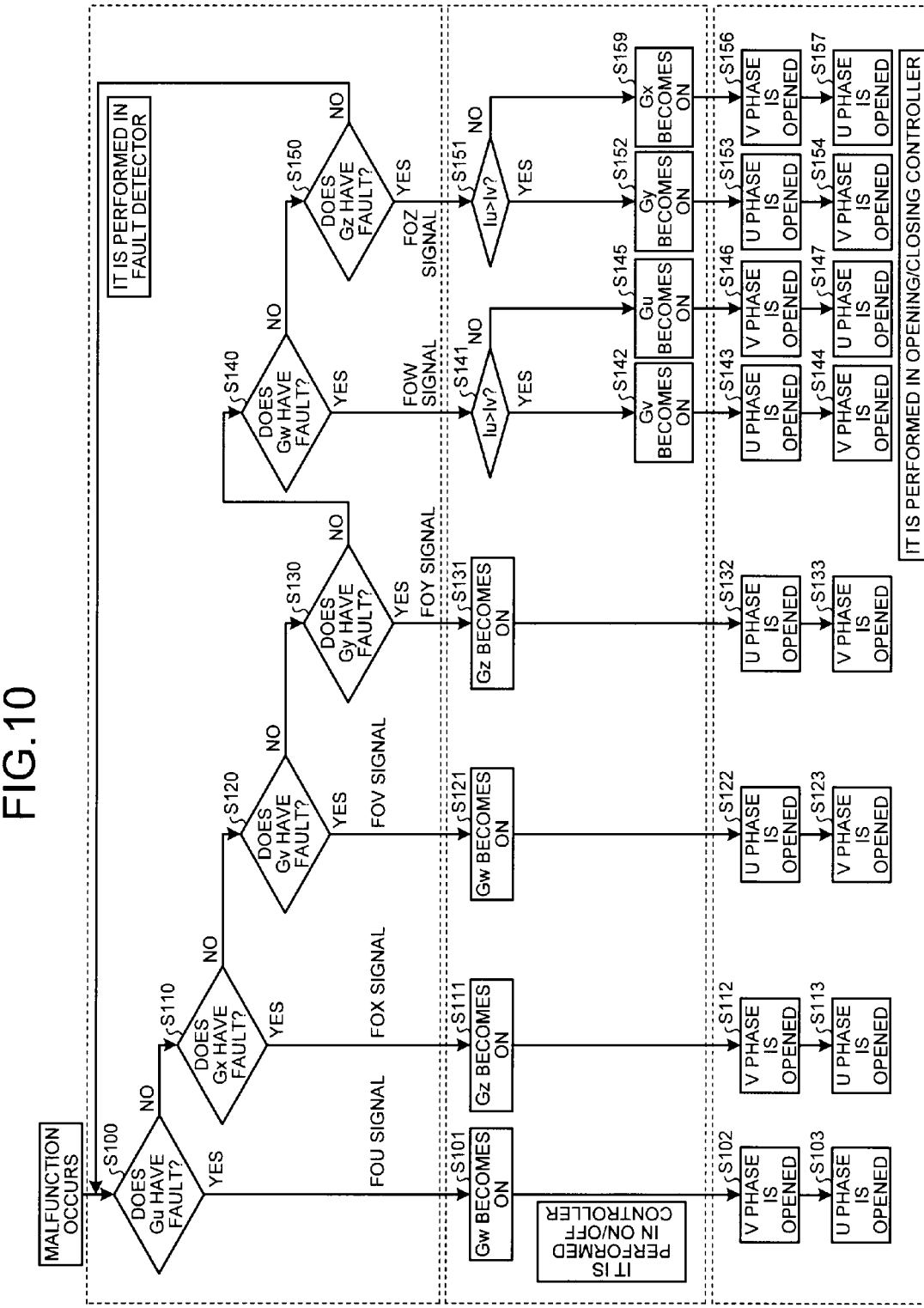
FIG. 10 is a flowchart explaining a series of operations performed since an abnormality occurs in a power converter shown in FIGS. 8 and 9 until an opening/closing unit is opened.

FIG. 8 depicts a configuration of a power converting apparatus for an electric vehicle according to a second embodiment of the present invention, FIG. 9 depicts another configuration of the power converting apparatus for an electric vehicle according to the second embodiment, and FIG. 10 is a flowchart explaining a series of operations performed since an abnormality occurs in the power converter 2 shown in FIGS. 8 and 9 until the opening/closing unit 4 is opened. In the second embodiment, elements same as those in the first embodiment are denoted by like reference signs and explanations thereof will be omitted, and only features different from those of the first embodiment are explained.

A feature of the second embodiment different from the first embodiment is that opening/closing units are installed for only two phases (for example, the U phase and the V phase). Therefore, an opening/closing controller 24 can be configured to output a control signal only for the two phases, as shown in FIG. 8. Similarly, an ON/OFF controller 27 can be configured to output opening/closing-unit opening commands only for the two phases.

The power converting apparatus according to the present embodiment can be configured in a mode as shown in FIG. 9. That is, the power converting apparatus shown in FIG. 9 has such a configuration that the opening/closing unit 4 is not connected between the power converter 2 and the synchronous machine 1 as shown in FIG. 8 but a neutral point 26 of a synchronous machine 25 can be connected outside the synchronous machine 25. That is, the opening/closing unit 4 is connected on the side of the neutral point 26 of the synchronous machine 25. In the power converting apparatuses shown in FIG. 8 and FIG. 9, the opening/closing units are connected to the U phase and the V phase; however, a combination other than the U phase and the V phase can be also adopted.

It is a feature largely different from the first embodiment that, as shown in FIG. 10, when an SW element (for example, Gu) of a phase to which the opening/closing unit is connected has a short-circuit fault (YES at Step S100), an SW element (for example, Gw) of a phase to which the opening/closing unit is not connected is preferentially set to an ON operation state. To be more specific, the ON/OFF controller 27 according to the present embodiment preferentially sets an SW element (for example, Gw) of a phase to which the opening/closing unit (for example, the U-phase opening/closing unit 4a or the V-phase opening/closing unit 4b) is not connected to an ON operation state, taking the opening operation of the opening/closing unit into consideration at the time of selecting an SW element to be set to an ON operation state (Step S101).

Furthermore, the opening/closing controller 24 opens the V-phase opening/closing unit 4b after a predetermined time has passed since turning on of the SW element Gw (Step S102), and then opens also the U-phase opening/closing unit 4a (Step S103).

Operations of the power converting apparatus are explained below in comparison to the waveform shown in FIG. 7(*b*). The ON/OFF controller 27 preferentially sets the SW element Gw to the ON operation state after about 0.02 second since the occurrence of a short-circuit fault in the SW element Gu, for example (Step S101). The opening/closing controller 24 opens the V-phase opening/closing unit 4b after about 0.03 second since the occurrence of the short-circuit fault (Step S102). As a result, the transitional voltage is suppressed to a value lower than the dielectric strength voltage of the motor. Further, as shown in the upper part of FIG. 7(*b*), because the current is stabilized and is close to zero even after the V-phase opening/closing unit 4b is opened, the U-phase opening/closing unit 4a can be also opened immediately (Step S103).

However, if an SW element of a phase to which the opening/closing unit is not connected has a short-circuit fault, an SW element to be set to an ON operation state is selected to select an opening/closing unit to be opened, as in the first embodiment. However, the opening/closing unit to be opened last is of a phase to which the opening/closing unit is connected, unlike the first embodiment.

This is explained below with reference to FIG. 10. When an SW element (for example, Gw) of a phase to which the opening/closing unit is not connected has a short-circuit fault (YES at Step S140), the fault detector 9 outputs a W-phase upper-arm fault detection signal FOW. The ON/OFF controller 27 selects an SW element to be set to an ON operation state based on the fault detection signal FOW and the phase currents Iu, Iv, and Iw (Step S141). When the motor current Iu is larger than Iv (YES at Step S141), the SW element Gv becomes ON (Step S142). The opening/closing controller 24 opens the U-phase opening/closing unit 4a (Step S143), and opens the V-phase opening/closing unit 4b after waiting for a predetermined time period since opening of the U-phase opening/closing unit 4a (Step S144).

At Step S141, when the motor current Iu is smaller than Iv (NO at Step S141), the SW element Gu becomes ON (Step S145). The opening/closing controller 24 opens the V-phase opening/closing unit 4b (Step S146), and opens the U-phase opening/closing unit 4a after waiting for a predetermined time period since opening of the V-phase opening/closing unit 4b (Step S147). Operations (Steps S150 to S157) in the case where an SW element (for example, Gz) of a phase to which the opening/closing unit is not connected has a short-circuit fault are similar to those at Steps S140 to S147 described above.

At Step S100, when an SW element (for example, Gu) of a phase to which the opening/closing unit is connected has no short-circuit fault (NO at Step S100), the fault detector 9 determines whether the U-phase lower arm (SW element Gx) has a fault (Step S110).

In this way, the fault detector 9 sequentially determines whether each of the SW elements has a fault, and when the W-phase upper arm (SW element Gz) has no fault (NO at Step S150), the fault detector 9 repeats determination at Step S100 and the subsequent steps. The ON/OFF controller 27 performs ON control of each of the SW elements and generates opening/closing-unit opening commands for the opening/closing controller 24 based on the fault detection signals FOX to FOZ and the phase currents Iu, Iv, and Iw. Furthermore, the opening/closing controller 24 performs an opening operation of each of the opening/closing units 4a, 4b, and 4c based on the opening/closing-unit opening commands. In FIG. 10, while the operations only at Steps S100 to S103 and S140 to S147 have been explained, explanations of operations at other steps will be omitted because these operations are same as those at the steps explained above.

As explained above, the power converting apparatus according to the present embodiment sets one of the SW elements that constitute a phase other than the first phase, in which an SW element has a short-circuit fault or remains in an ON operation state (for example, the U phase), to an ON operation state as in the first embodiment. Consequently, the opening/closing unit can be opened by using current zero, and the fault current can be reliably blocked. Furthermore, the opening/closing unit connected to the third phase (for example, the V phase) other than the first phase (for example, the U phase) and the second phase in which one of the SW elements is in an ON operation state (for example, the W phase) is opened. Consequently, the occurrence of the transitional voltage at the time of opening the opening/closing unit can be suppressed. Further, when the SW element Gu has a fault, for example, the operation of the SW element having no fault is limited to only one phase (for example, the W phase). Therefore, stress and load on other SW elements (for example, Gv and Gy of the V phase) having no fault can be reduced, and an expansion of a fault can be prevented. As a result, because frequency of faults can be considerably reduced as compared to the conventional techniques, the reliability of the power converting apparatus is improved and the power converting apparatus can be used for a long time, and also the maintenance cost can be reduced. Furthermore, in the power converting apparatus according to the present embodiment, because the opening/closing units are connected to only two phases, an opening/closing unit for one phase is not required as compared to the first embodiment. Therefore, downsizing, weight reduction, and cost reduction of the power converting apparatus can be realized.

Furthermore, the opening/closing controllers 8 and 24 according to the first and second embodiments open the opening/closing unit related to a phase to which a faulty SW element belongs in the second opening operation of the opening/closing unit connected to each phase, as shown in FIG. 5 and FIG. 10. Therefore, an expansion of a fault can be prevented. To explain this process more specifically, at Steps S13 and S14 in FIG. 5, for example, the opening/closing unit of a phase (the V phase) to which SW elements having no fault belong is opened first (S13), and the opening/closing unit of a phase (the U phase) to which a faulty SW element belongs is opened second (S14). The opening/closing controllers 8 and 24 are configured in such a manner that the opening/closing unit of a phase (the W phase) to which a faulty SW element belongs is opened after Step S14, that is, the U-phase opening/closing unit is preferentially opened before the W-phase opening/closing unit.

In the above explanations, the operations of the power converting apparatus have been explained designating the U phase as the first phase, the W phase as the second phase, and the V phase as the third phase. Alternatively, it is possible to regard the W phase as the third phase and the V phase as the second phase, for example. In addition, when the V phase is designated as the first phase, it is possible to regard the W phase as the second phase and the U phase as the third phase.

The configuration described in the second embodiment, that is, the configuration in which the opening/closing unit 4 is connected on the side of the neutral point 26 in FIG. 9 is also applicable to the first embodiment. When this configuration is applied to the opening/closing controller 8 according to the first embodiment, the configuration of the opening/closing unit does not change; however, a calculating process of the opening/closing-unit opening commands in the ON/OFF controller 7 and an open/close control process in the opening/closing controller 8 can be reduced.

INDUSTRIAL APPLICABILITY

As described above, the present invention is applicable to a power converting apparatus for propulsion control of an electric vehicle and is particularly useful as an invention capable of suppressing a transitional voltage generated at the time of opening an opening/closing unit and reducing load on a switching element having no fault.

REFERENCE SIGNS LIST 1, 25 SYNCHRONOUS MACHINE
2 POWER CONVERTER
3a U-PHASE CURRENT DETECTOR
3b V-PHASE CURRENT DETECTOR
3c W-PHASE CURRENT DETECTOR
4 OPENING/CLOSING UNIT
4a U-PHASE OPENING/CLOSING UNIT
4b V-PHASE OPENING/CLOSING UNIT
4c W-PHASE OPENING/CLOSING UNIT
5 DC POWER SUPPLY
6 CONTROLLER
7, 27 ON/OFF CONTROLLER
8, 24 OPENING/CLOSING CONTROLLER
9 FAULT DETECTOR
10a U-PHASE SHORT-CIRCUIT-FAULT DETECTOR
10b V-PHASE SHORT-CIRCUIT-FAULT DETECTOR
10c W-PHASE SHORT-CIRCUIT-FAULT DETECTOR
11a U-PHASE CURRENT-CODE DETERMINING UNIT
11b V-PHASE CURRENT-CODE DETERMINING UNIT
11c W-PHASE CURRENT-CODE DETERMINING UNIT
12a U-PHASE FAULT-LOCATION DETECTOR
12b V-PHASE FAULT-LOCATION DETECTOR
12c W-PHASE FAULT-LOCATION DETECTOR
13a, 13b, 13c ABSOLUTE-VALUE CALCULATING UNIT
14a, 14b, 14c, 14d, 14e, 14f, 19a, 19b, 19c, 19d, 19e, 19f GREATER-THAN COMPARATOR
15a, 15b, 15c, 15d, 15e, 15f, 15g, 15h, 15i, 23a, 23b, 23c ON TIME ELEMENT 16a, 16b, 16c, 20a, 20b, 20c, 20d, 20e, 20f LESS-THAN COMPARATOR
17a U-PHASE FAULT DETECTOR
17b V-PHASE FAULT DETECTOR
17c W-PHASE FAULT DETECTOR
18a, 18b, 18c, 18d, 18e, 18f, 21a, 21b, 21c, 21d, 21e, 21f, 21g, 21h, 21i, 21j, 21k, 21l AND UNIT
22a, 22b, 22c, 22d, 22e, 22f, 22g, 22h, 22i OR UNIT
26 NEUTRAL POINT OF SYNCHRONOUS MACHINE
FOU U-PHASE UPPER-ARM FAULT DETECTION SIGNAL
FOX U-PHASE LOWER-ARM FAULT DETECTION SIGNAL
FOV V-PHASE UPPER-ARM FAULT DETECTION SIGNAL
FOY V-PHASE LOWER-ARM FAULT DETECTION SIGNAL
FOW W-PHASE UPPER-ARM FAULT DETECTION SIGNAL
FOZ W-PHASE LOWER-ARM FAULT DETECTION SIGNAL
Gu, Gv, Gw, Gx, Gy, Gz SWITCHING ELEMENT
Iset PREDETERMINED SET VALUE
Iu U-PHASE CURRENT
Iv V-PHASE CURRENT
Iw W-PHASE CURRENT
MUOFF U-PHASE OPENING/CLOSING UNIT OPENING COMMAND
MVOFF V-PHASE OPENING/CLOSING UNIT OPENING COMMAND
MWOFF W-PHASE OPENING/CLOSING UNIT OPENING COMMAND

The invention claimed is:

1. A power converting apparatus for an electric vehicle, the power converting apparatus comprising:
a power converter that has a plurality of ON/OFF-controlled switching elements and converts a DC voltage to an AC voltage of an arbitrary frequency to drive an AC rotating machine; at least two opening/closing units for AC blocking, connected between the power converter and the AC rotating machine; a current detector that detects a current flowing between the power converter and the AC rotating machine; and a controller that controls ON/OFF of the switching elements and opening/closing of the opening/closing units based on at least the current detected by the current detector, wherein
the controller includes:
a fault detector that detects whether any of the switching elements has a short-circuit fault or remains in an ON operation state based on a current value detected by the current detector, and outputs a signal indicating a detection result;
an ON/OFF controller that, when a switching element of a phase that is a first phase has a short-circuit fault or remains in an ON operation state, sets one of the switching elements that constitutes a second phase other than the first phase to an ON operation state based on the signal from the fault detector and the current value, and outputs a signal for opening an opening/closing unit that is connected to the first phase and an opening/closing unit that is connected to a third phase other than the first phase and the second phase;
an opening/closing controller that opens the opening/closing unit connected to the first phase and the opening/closing unit connected to the third phase by the ON/OFF controller based on the signal from the ON/OFF controller, and
the opening/closing controller opens the opening/closing unit connected to the third phase in a first opening operation and opens the opening/closing unit connected to the first phase in a second opening operation after the first opening operation.

2. The power converting apparatus for an electric vehicle according to claim 1, wherein the ON/OFF controller selects the switching element to be set to the ON operation state based on a magnitude of the current value.

3. The power converting apparatus for an electric vehicle according to claim 1, wherein the opening/closing controller controls, among the opening/closing units, any two of operations of an opening/closing unit connected to the first phase, an opening/closing unit connected to the second phase, and an opening/closing unit connected to the third phase.

* * * * *